(12) United States Patent
Rajakumar et al.

(10) Patent No.: US 6,980,399 B2
(45) Date of Patent: Dec. 27, 2005

(54) AIR BEARING SLIDERS WITH A PRESSURE CAVITY OR CAVITIES

(75) Inventors: Rajashankar Rajakumar, Richfield, MN (US); John R. Pendray, Edina, MN (US); Zine-Eddine Boutaghou, North Oaks, MN (US)

(73) Assignee: Seagate Technology LLC, Scotts Valley, CA (US)

( * ) Notice: Subject to any disclaimer, the term of this patent is extended or adjusted under 35 U.S.C. 154(b) by 173 days.

(21) Appl. No.: 10/686,953

(22) Filed: Oct. 15, 2003

(65) Prior Publication Data

US 2005/0083609 A1 Apr. 21, 2005

(51) Int. Cl.[7] ............................................. G11B 17/32
(52) U.S. Cl. ................................................. 360/235.5
(58) Field of Search ....................... 360/235.1–235.9, 360/236.1–236.6

(56) References Cited

U.S. PATENT DOCUMENTS

| | | | |
|---|---|---|---|
| 5,055,129 A | 10/1991 | Ghandehari | |
| 5,200,868 A | 4/1993 | Chapin et al. | |
| 5,490,026 A | 2/1996 | Dorius et al. | |
| 5,532,890 A | 7/1996 | Dorius et al. | |
| 5,583,722 A | 12/1996 | Dorius et al. | |
| 5,587,858 A | 12/1996 | Dorius et al. | |
| 5,610,784 A | 3/1997 | Dorius et al. | |
| 5,650,892 A | 7/1997 | Dorius et al. | |
| 5,721,650 A | 2/1998 | Crane et al. | |
| 5,726,831 A * | 3/1998 | White | 360/235.5 |
| 5,777,825 A | 7/1998 | Dorius | |
| 5,940,249 A * | 8/1999 | Hendriks | 360/235.6 |
| 6,069,769 A | 5/2000 | Dorius et al. | |
| 6,212,032 B1 | 4/2001 | Park et al. | |
| 6,233,118 B1 | 5/2001 | Boutaghou et al. | 360/235.4 |
| 6,411,468 B1 | 6/2002 | Park et al. | 360/236.3 |
| 6,445,543 B1 | 9/2002 | Gui et al. | 360/236.6 |
| 6,459,547 B1 | 10/2002 | Riddering et al. | 360/236.6 |
| 6,477,012 B1 | 11/2002 | Park et al. | 360/236.1 |
| 6,504,682 B1 | 1/2003 | Sannino et al. | 360/235.8 |
| 6,560,071 B2 | 5/2003 | Chapin et al. | 360/235.7 |
| 2002/0008939 A1 | 1/2002 | Boutaghou et al. | 360/235.8 |
| 2002/0071216 A1 | 6/2002 | Sannino et al. | 360/236.1 |
| 2003/0231429 A1 * | 12/2003 | Boutaghou et al. | 360/235.8 |
| 2004/0120075 A1 * | 6/2004 | Rajakumar | 360/235.8 |
| 2004/0201923 A1 * | 10/2004 | Rao et al. | 360/235.7 |

OTHER PUBLICATIONS

U.S. Appl. No. 10/376,864, filed Feb. 2003, Pendray et al.
U.S. Appl. No. 10/602,370, filed Jun. 2003, Pendray et al.

* cited by examiner

*Primary Examiner*—Allen Cao
(74) *Attorney, Agent, or Firm*—Westman, Champlin & Kelly P.A.

(57) ABSTRACT

A slider for a data storage device is disclosed. The slider includes a bearing pad or surface having a raised bearing surface, a stepped bearing surface and a recessed pressure cavity or cavities. The recessed pressure cavity or cavities provides a reduced raised bearing surface area to reduce stiction and shape sensitivity. The recessed pressure cavity or cavities include a recessed cavity surface which is recessed from the raised bearing surface of the bearing surface or pad and a cavity step to the raised bearing surface.

20 Claims, 12 Drawing Sheets

AIR BEARING SLIDERS WITH A PRESSURE CAVITY OR CAVITIES

FIELD OF THE INVENTION

The present invention relates generally to a data storage device, and more particularly but not by limitation to an air bearing for a head of a data storage device or system.

BACKGROUND OF THE INVENTION

Data storage devices store digitally encoded information on discs. Heads read data from or write data to discs which are supported for rotation relative to a base chassis by a spindle motor or drive. Heads include transducer elements, such as magnetoresistive, magneto-optical or inductive elements for read or write operations. An actuator assembly moves the head relative to select data tracks on the disc to read or write data to the disc surface or media.

Typically the head includes a slider having an air bearing surface which is coupled to a head suspension assembly. Rotation of the disc creates an air flow along the air bearing surface to provide a pressure profile and lift force. The lift force of the air bearing is countered by a load force supplied via a load beam of the suspension assembly to define in part a fly height of the slider. Slider fabrication processes typically introduce shape variations across the air bearing profile. The pressure profile of the air bearing slider is sensitive to variation in the air bearing profile. For contact starts and stops (CSS) the raised surfaces of the air bearing contact the disc surface. During operation the air bearing slider can intermittently contact the disc surface. Contact stiction between the slider or air bearing surfaces and disc surface during CSS or intermittent contact can interfere with drive operations. Embodiments of the present invention provide solutions to these and other problems, and offer other advantages over the prior art.

SUMMARY OF THE INVENTION

The present invention relates to a slider for a data storage device. The slider includes a bearing pad or surface having a raised bearing surface, a stepped bearing surface and a recessed pressure cavity or cavities. The recessed pressure cavity or cavities provides a reduced raised bearing surface area to reduce stiction and shape sensitivity. The recessed pressure cavity or cavities include a recessed cavity surface which is recessed from the raised bearing surface of the bearing surface or pad and a cavity step to the raised bearing surface. Other features and benefits that characterize embodiments of the present invention will be apparent upon reading the following detailed description and review of the associated drawings.

DETAILED DESCRIPTION OF ILLUSTRATIVE EMBODIMENTS

Figure 1:
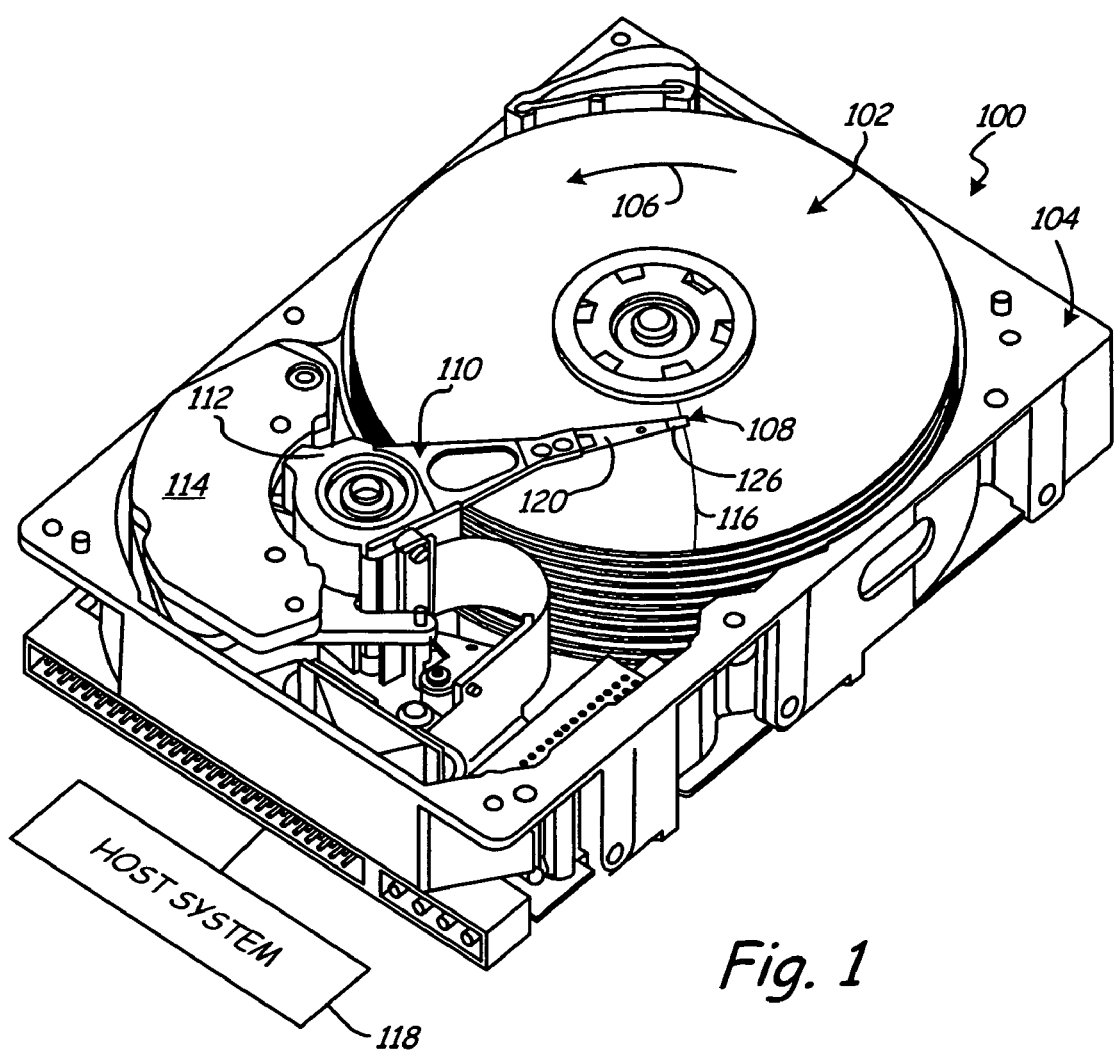
FIG. 1 is a perspective illustration of a data storage device.

FIG. 1 is a perspective illustration of a data storage device 100 in which embodiments of the present invention are useful. Device 100 includes a plurality of discs 102 rotationally coupled to a base chassis 104 via a spindle motor (not shown) as illustrated by arrow 106. Heads (such as for example, magnetoresistive, magneto-optical, giant magnetoresistive or inductive heads) are coupled to an actuator assembly 110 to position the heads 108 to read data from or write data to the discs 102. In the embodiment shown, the actuator assembly 110 includes an actuator 112 which is rotated via operation of a voice coil motor (VCM) 114 to move the head 108 as illustrated by arrow 116 relative to selected tracks on the disc 102 based upon commands or signals from a host computer or system 118 (illustrated schematically). In the embodiment shown, the head 108 is coupled to the actuator 112 via a suspension assembly 120. The suspension assembly 120 includes a gimbal spring (not shown) to allow the head 108 to pitch and roll to follow the topography of the disc surface.

Head 108 includes slider 126 which carries transducer elements for read or write operations. Rotation of the disc provides an air flow along air bearing surfaces of the slider 126 to provide a pressure profile or lifting force $F_{air\ bearing}$ between the bearing surfaces and the disc surface or media. The lifting force $F_{air\ bearing}$ of the air bearing slider 126 is countered by a load force to define in part a fly height $H_{fly}$ of the slider or head above the disc surface. Slider fabrication processes typically introduce shape variations across the air bearing profile or cross or length dimension of the slider. In particular, slider fabrication processes typically introduce a cross curve and/or crown to the slider body or air bearing surfaces. The shape and contour of the crown and/or cross-curve is non-uniform and can vary within manufacturing tolerance parameters.

Shape variations in the fabricated air bearing slider, or across the air bearing profile, provide a shape sensitive pressure profile (e.g. twist or roll shape sensitivity) which affects fly height parameters of the air bearing slider. The present invention relates to an air bearing surface or pad having a recessed pressure cavity or cavities. The recessed pressure cavity or cavities provide a recessed surface area along a cross or length dimension of the bearing surface or pad to reduce contact stiction and/or shape sensitivity.

Figure 2:
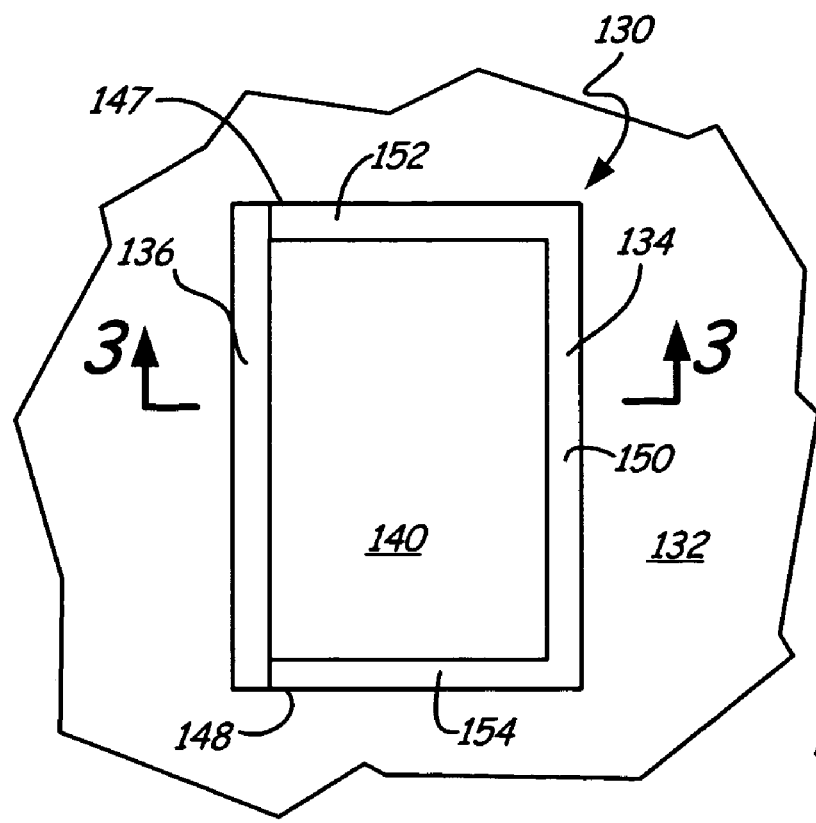
FIG. 2 is a plan view of an embodiment of a bearing pad or surface including a recessed pressure cavity.
Figure 3:
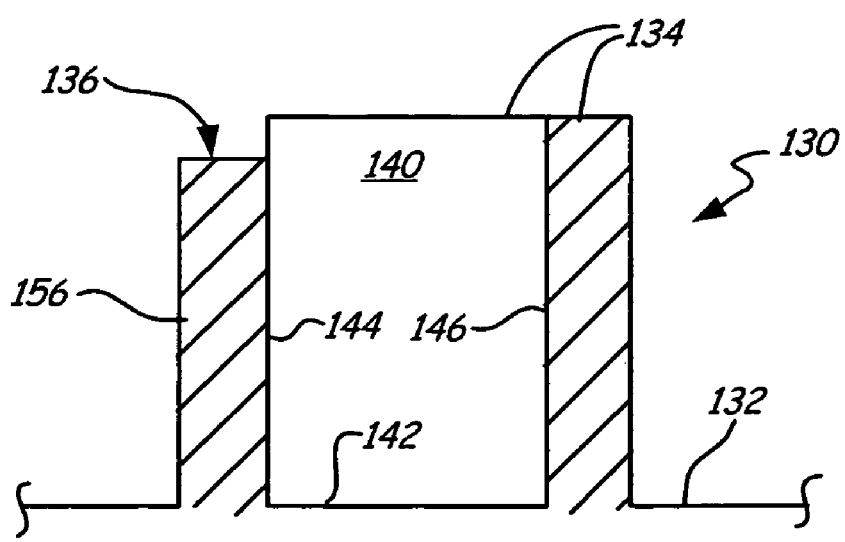
FIG. 3 is a cross sectional view as taken along line 3—3 of FIG. 2.

FIGS. 2–3 illustrate an embodiment of an air bearing pad or surface 130 elevated above a milled or recessed surface 132 for the slider 126. As shown, the air bearing pad 130 includes a raised bearing surface 134 at a substrate surface (0.0 milled depth) and a stepped bearing surface 136 recessed or milled below the raised bearing surface 134. The stepped bearing surface 136 provides a pressure step or transition to the raised bearing surface or surfaces 134. As shown, the air bearing pad 130 includes a recessed pressure cavity 140 having a recessed cavity surface 142 recessed below the raised and stepped surfaces of the pad 130. As shown, the bearing pad or surface 130 includes a leading edge cavity step 144 from the stepped surface 136 to the recessed cavity surface 142 and a trailing edge cavity step 146 to the raised bearing surface 134 of the pad.

In the illustrated embodiment, cavity step 146 extends from the recessed cavity surface 142 to the raised cavity surface, although application is not limited to the specific embodiment or step rise shown. Also in the illustrated embodiment, the stepped bearing surface 136 extends between opposed sides 147, 148 of the bearing pad or surface 130 although application is not limited to the particular embodiment shown. Thus as described, the present invention provides a recessed pressure cavity for a bearing pad or surface to provide a recessed area for a bearing pad or surface (e.g. having a length to wide ratio less than or equal to 2.0) in addition to or in contrast to an elongate rail.

As previously described, rotation of the disc creates an air flow along the bearing pad or surface 130 to provide a pressure profile for operation. Air flow along the bearing pad or surface 130 is contained or pressurized relative to the pressure cavity 140 to provide an effective raised bearing surface or profile with reduced surface area and shape sensitivity. The raised bearing surface 134 of the pad or surface 130 is formed at the substrate level (zero etched depth) and the stepped bearing surface 136 and recessed cavity surface 142 are formed by a multiple stage milling process to form a plurality of etched depths for the stepped bearing surface 136 and the recessed cavity surface 142.

In the embodiment shown, raised bearing surfaces of the bearing pad or surface 130 are formed by a "U" shaped structure having a trailing edge portion 150 and opposed side portion 152, 154 elevated above the recessed cavity surface 142 to form the trailing edge cavity step 146 to the raised bearing surface and opposed side steps along opposed sides or side portion 152, 154 of the bearing pad or surface. Stepped surface 136 is formed proximate to a leading edge or portion of the "U" shaped structure to form a bearing step 156 from the recessed cavity surface 132 of the slider to stepped surface 136 and the leading edge cavity step 144 from the stepped surface to the recessed cavity surface 142.

In the embodiment shown, the "U" shaped structure forms the trailing edge cavity step extending the trailing edge and opposed side cavity steps to contain air for pressurization of the bearing. Thus, as shown, air flow is facilitated into the pressure cavity 140 via the recessed stepped bearing surface 136 and is contained by the raised bearing surface 134 having a higher elevation than the stepped bearing surface 136 to provide an effective raised bearing surface or profile for the bearing pad with reduced surface area and shape sensitivity. In an illustrative embodiment, the stepped bearing surface 136 is recessed approximately 0.1–0.3 μm from the raised bearing surface 134 and the recessed cavity surface is milled or etched to a cavity depth of approximately 2–3 μm. The "U" shaped structure is formed of thin walled structure which, in an illustrative embodiment, has a 20 μm thick or width.

Figure 4:
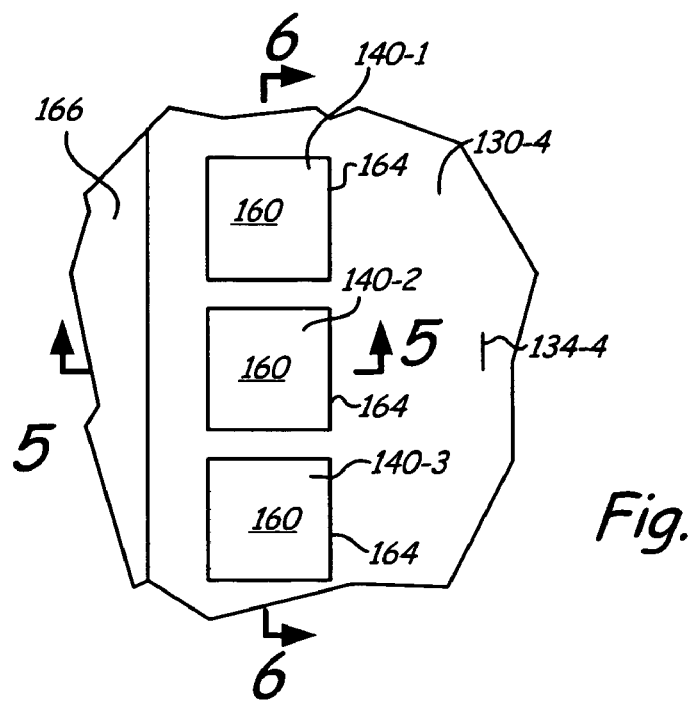
FIG. 4 is a plan view of a portion of a bearing pad or surface illustrating an alternate embodiment of recessed pressure cavities of the present invention.
Figure 5:
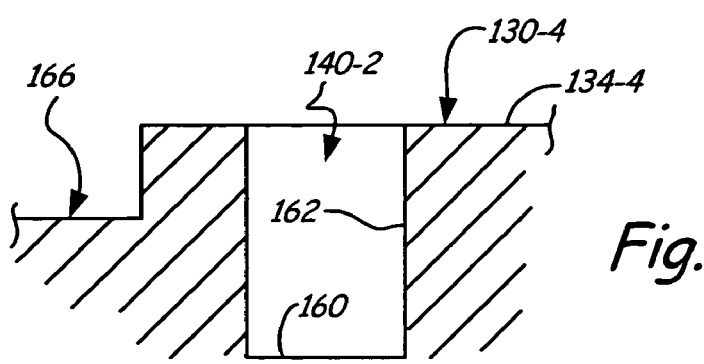
FIG. 5 is a cross sectional view as taken along line 5—5 of FIG. 4.
Figure 6:
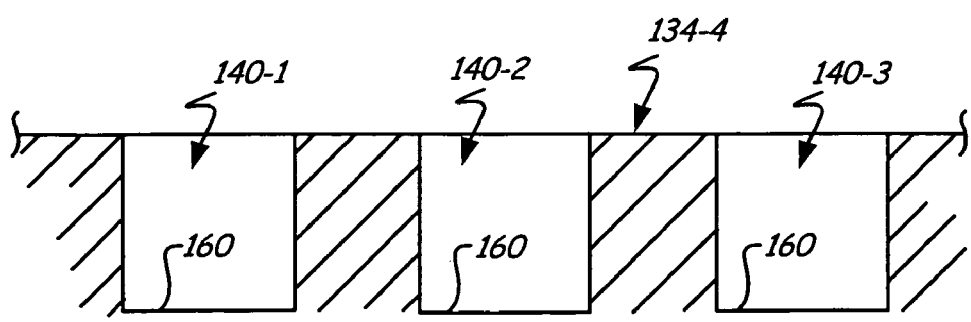
FIG. 6 is a cross sectional view as taken along line 6—6 of FIG. 4.

In an alternate embodiment of a bearing pad or surface 130-4 illustrated in FIGS. 4–6, the bearing pad or surface 130-4 includes a plurality of spaced pressure cavities 140-1, 140-2, 140-3 spaced on the raised bearing surface 134-4. In the embodiment shown, as illustrated in FIGS. 5–6, the spaced pressure cavities 140-1, 140-2, 140-3 include a recessed cavity surface 160 recessed below the raised surface 134-4 to form a cavity step 162 to the raised bearing surface 134-4 about the perimeter 164 of the recessed pressure cavities 140-1, 140-2, 140-3 to contain air for pressurization. As shown, the bearing pad or surface 130-4 includes a stepped bearing surface 166 recessed from the raised bearing surface 134-4 to provide a bearing step from a recessed surface (not shown) of the slider body to the raised bearing surface 134-4 to pressurize air flow thereal-ong. In the illustrated embodiment, the recessed cavity surface 160 is recessed below the raised and stepped bearing surfaces 134-4, 166, however application is not limited to a particular recessed dimension for the recessed cavity surface 160. Thus, the pressure cavities provide a bearing surface profile having a reduced contact surface and reduced shape sensitivity.

Figure 7:
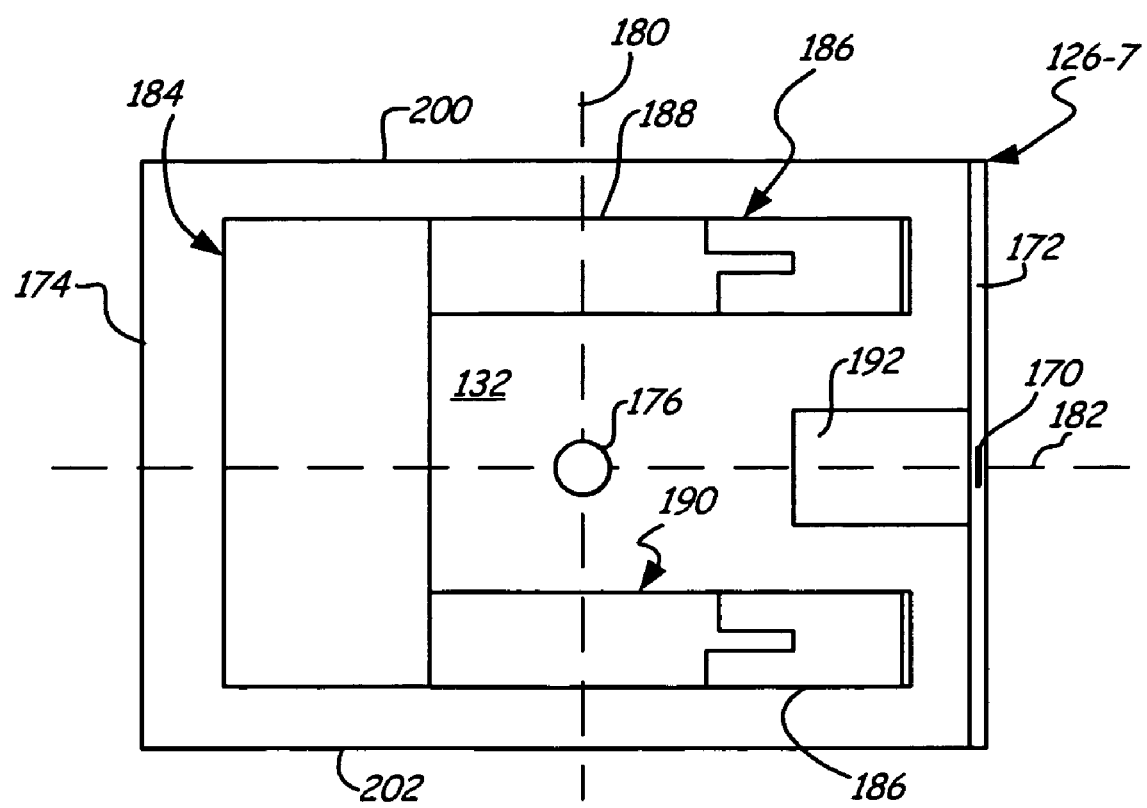
FIG. 7 schematically illustrates an embodiment of a slider including a leading edge bearing pad.

For a magnetic recording head or slider 126-7 as shown in FIG. 7, transducer elements 170 (illustrated diagrammatically) are fabricated or deposited proximate to a trailing edge 172 of the slider or head. Typically, the slider flies at a pitch angle such that trailing edge 172 of the slider flies closer to the disc surface than a leading edge 174. Load point 176 is positioned between the leading edge 174 and trailing edge 172 of the slider 126-7 to define a pitch axis 180 and a roll axis 182 about which the slider pitches and rolls. The pitch angle or roll affect fly height parameters of the slider or spacing between the head (or transducer elements) and the disc or media.

Slider embodiments include leading edge pad(s) or surfaces 184 which define a raised bearing surface forward of the load point. In the illustrated embodiment, slider 126-7 includes raised bearing surfaces 186 along rails 188, 190 and along center pad 192 to provide raised bearing surface areas aft of the load point 176. Leading edge bearing pad 184 of known slider embodiments have a relatively large cross width dimension extending generally between opposed sides 200, 202 of the slider body to provide a relatively large bearing surface area forward of the load point 176 to provide pressurization and pitch. The relatively large bearing surface area increases shape sensitivity and stiction for the leading edge pad 184.

Figure 8:
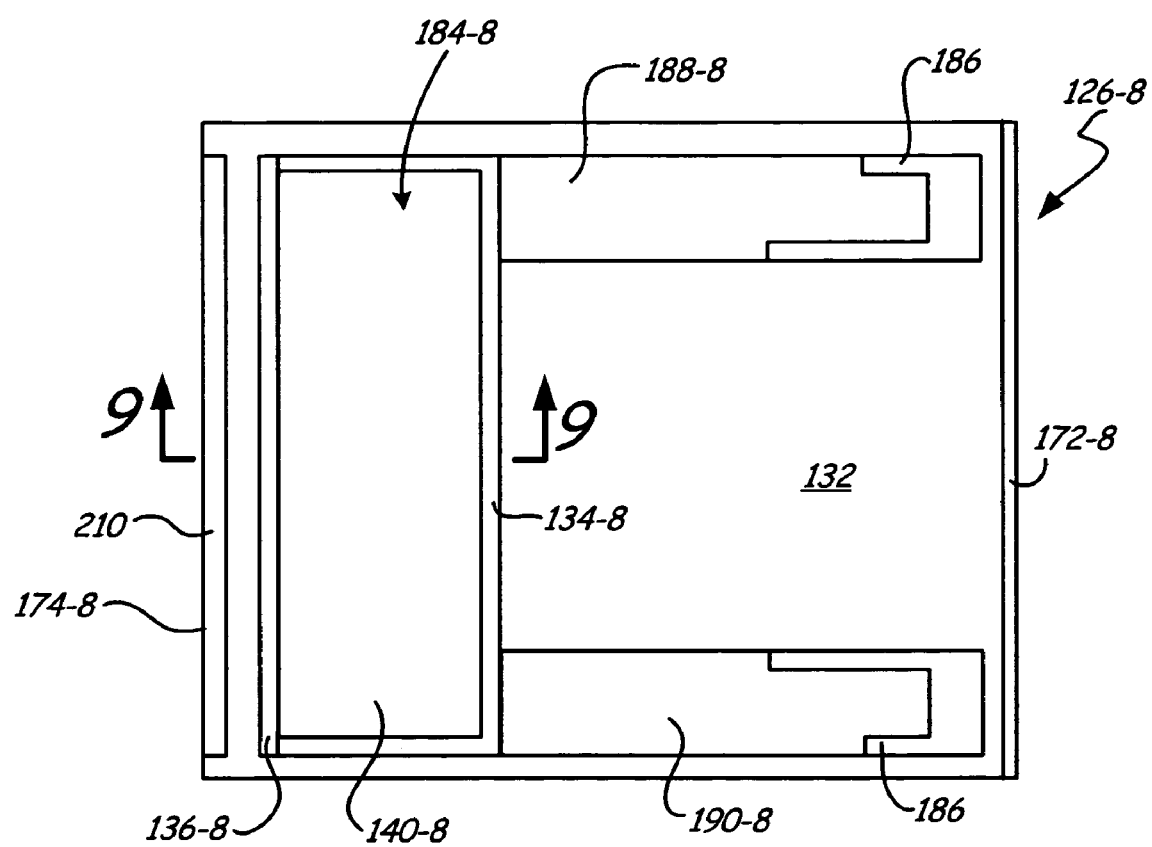
FIG. 8 illustrates an embodiment of a slider including a leading edge bearing pad having a recessed pressure cavity.
Figure 9:
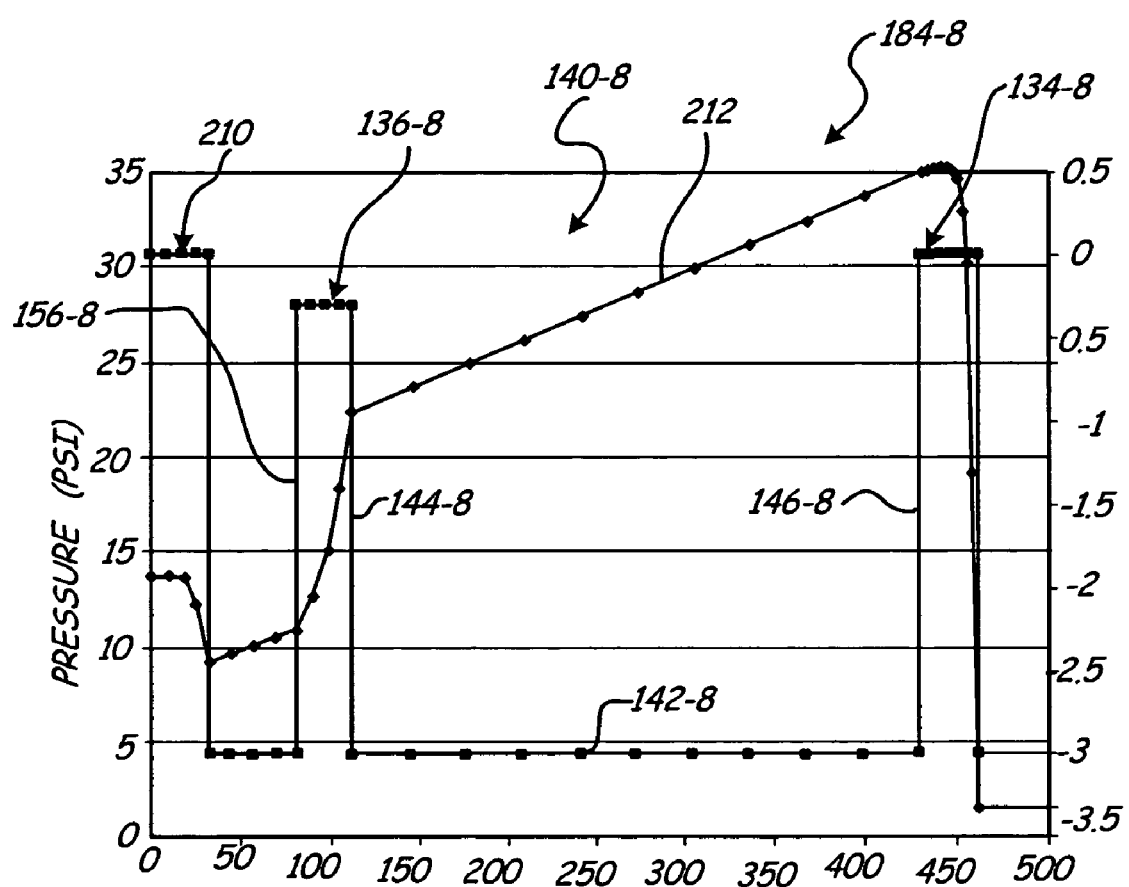
FIG. 9 illustrates a surface and pressure profile for the leading edge bearing pad and recessed pressure cavity of FIG. 8.

FIGS. 8–9 illustrate a slider 126-8 embodiment including a leading edge bearing pad or surface 184-8 having a recessed pressure cavity 140-8 as shown and opposed rails 188-8, 190-8 including raised bearing pads or surfaces 186 proximate to the trailing edge of the slider. In particular, the leading edge bearing pad 184-8 includes a stepped surface 136-8 recessed below a raised bearing surface 134-8 and a recessed cavity surface 142-8 of the recessed pressure cavity 140-8 recessed below the raised bearing surface 134-8 and stepped surface 136-8. As shown, pad 184-8 includes a leading edge bearing step 156-8 to the stepped bearing surface 136-8 and recessed cavity step 144-8 from the stepped surface 136-8 to the recessed cavity surface 142-8. The bearing pad 184-8 includes a trailing edge cavity step 146-8 to the raised surface 134-8. In the particular embodiment shown, the air bearing of the slider also includes a cross rail or dam 210 between the leading edge 174-8 of the slider and the leading edge bearing pad 184-8.

As graphically shown in FIG. 9, the bearing pad (including stepped surface 136-8 and raised surface 134-8) provides a bearing surface or raised pressure profile 212 having a relatively high pressure area proximate to the trailing edge or portion of the bearing pad. This pressure is developed as a result of a rise in cavity area pressure until flow reaches equilibrium. The equilibrium pressure reached in the cavity 140-8 is similar to that reached if the cavity area was at the raised surface elevation of the air bearing surface.

In the embodiment shown, the bearing pad 184-8 includes a trailing edge cavity step 148-8 and opposed side cavity steps from the recessed cavity surface 142-8 formed by relatively a thin walled "U" shaped structure having a raised surface height corresponding to the substrate surface of the slider body (i.e. 0.0 milled depth). The stepped bearing surface 136-8 and leading edge bearing step 156-8 and cavity step 144-8 are also formed by a relatively thin walled portion having a stepped surface height recessed below the substrate or raised air bearing surface 134-8.

Figure 10:
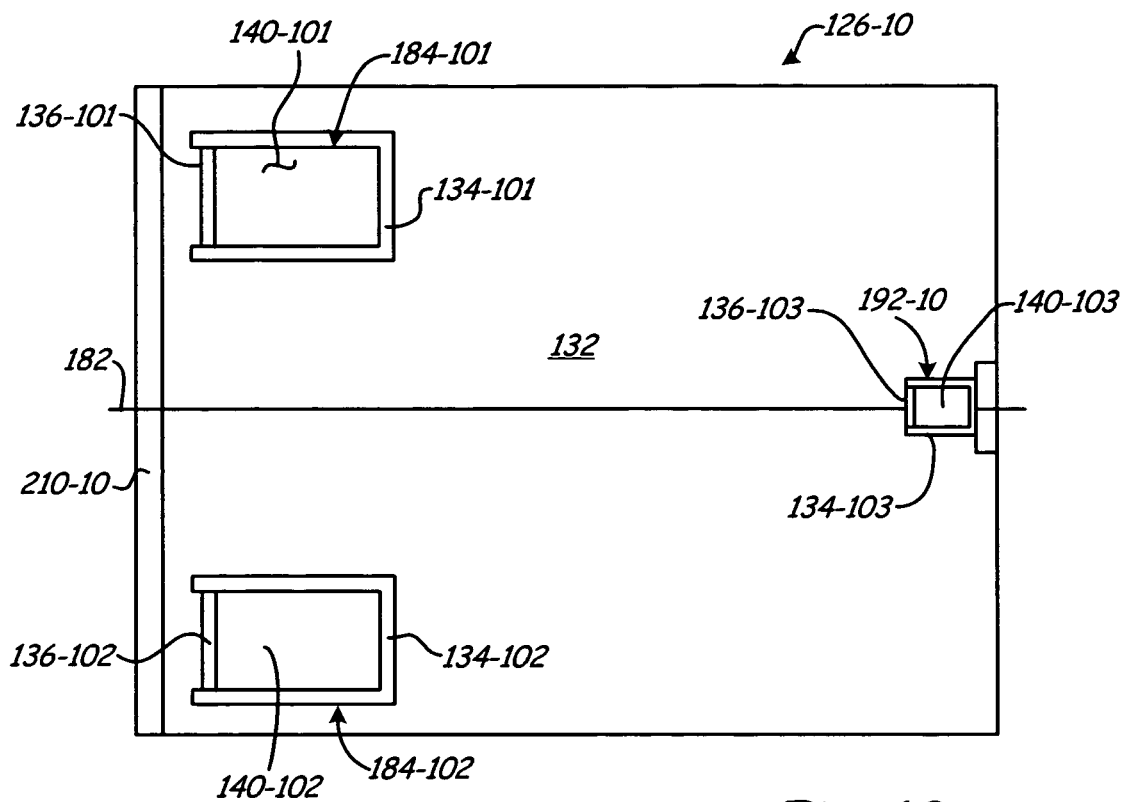
FIG. 10 illustrates an alternate slider embodiment including bearing pads having recessed pressure cavities.

FIG. 10 illustrates an alternate slider embodiment 126-10 where like numbers are used to identify like parts in the previous FIGS. Slider 126-10 includes spaced leading edge pads 184-101, 184-102 (on opposed sides of the roll axis 182) and a trailing edge pad 192-10 including recessed pressure cavities 140-101, 140-102, 140-103 as previous described. As shown, pads similarly include leading edge stepped surface 136-101, 136-102, 136-101 below raised bearing surfaces 134-101, 134-102, 134-103 and a recessed cavity surface to form a leading edge bearing step and a leading edge cavity step from the stepped bearing surface to the recessed cavity surface.

Figure 11:
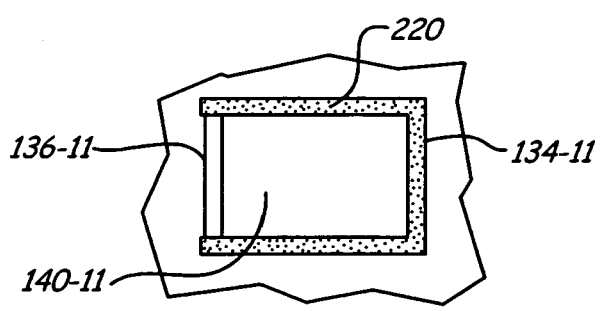
FIG. 11 illustrates an embodiment of a bearing pad or surface having a raised textured or roughened surface structure and a recessed pressure cavity.

The pads includes a cavity step to the raised bearing surface along the trailing edge and opposed sides of the pad as previously described. Thus as described, air flows into the recessed pressure cavity or cavities via the stepped bearing surface or surfaces and is pressurized to form an effective bearing surface having a relatively low stiction surface area. As shown in FIG. 11, the raised bearing surface 134-11 of the bearing pads or surfaces 130, 184 can have a roughened or textured surface structure 220 to provide further stiction control. Although the figures illustrate a specific arrangement or location for bearing pads or surfaces, application is not limited to the specific bearing pad or surfaces shown.

Figure 12:
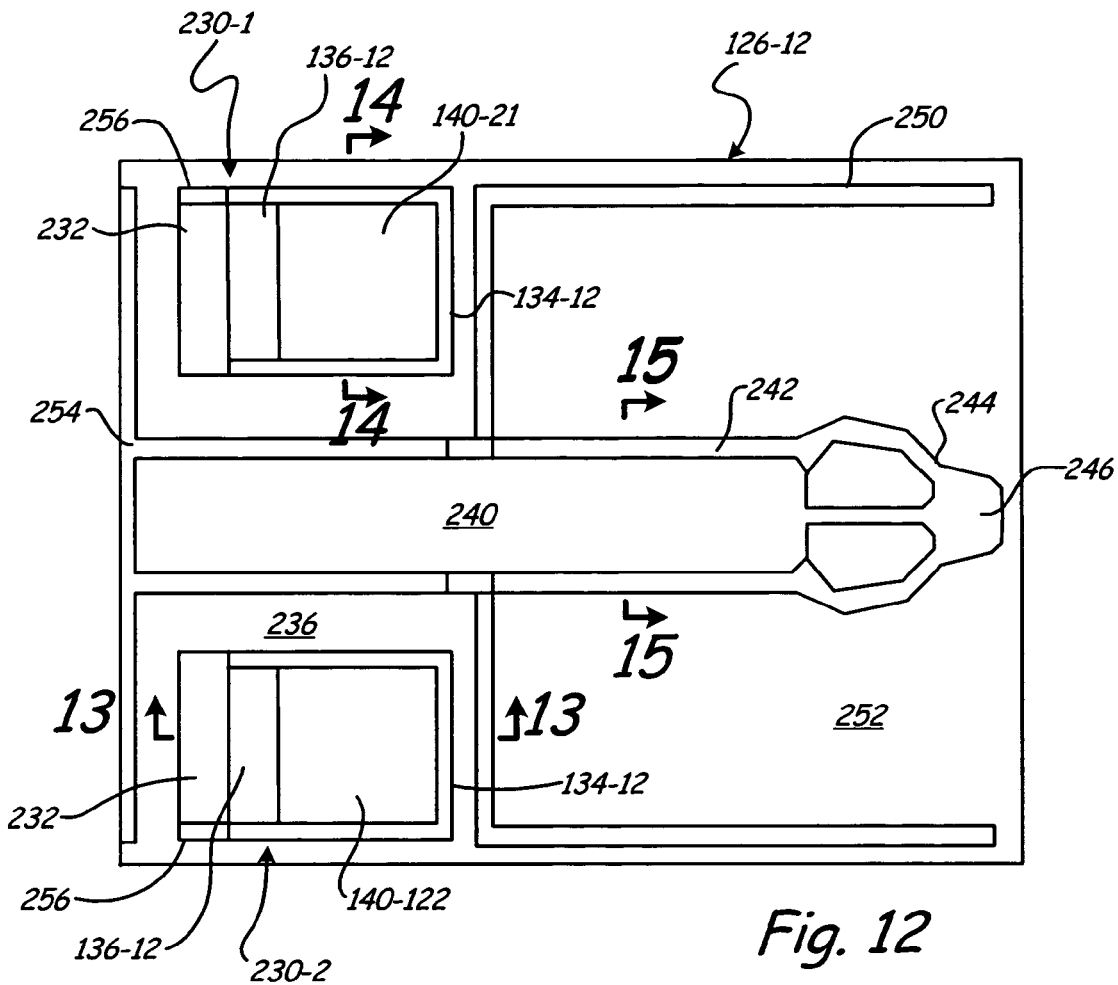
FIG. 12 illustrates an embodiment of a slider including leading edge bearing pads including recessed pressure cavities.
Figure 13:
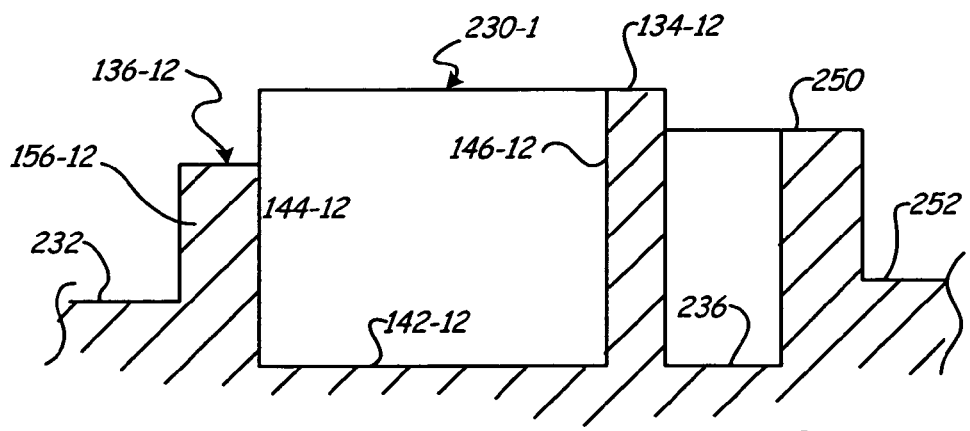
FIG. 13 is a cross sectional view taken along line 13—13 of FIG. 12.
Figure 14:
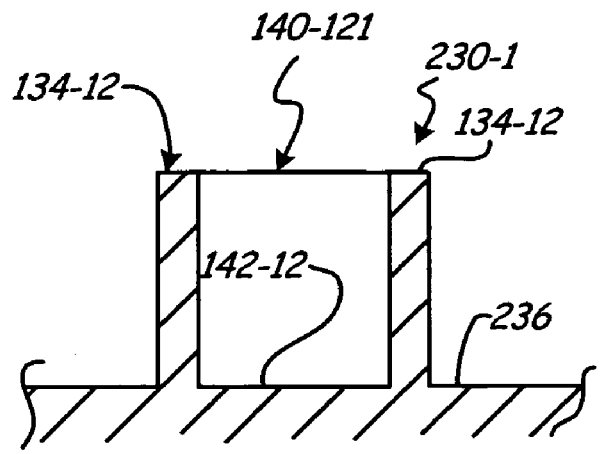
FIG. 14 is a cross sectional view taken along line 14—14 of FIG. 12.
Figure 15:
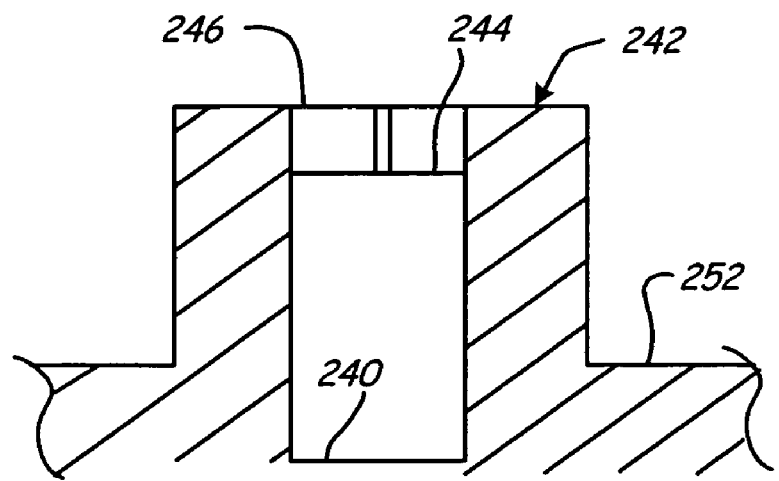
FIG. 15 is a cross sectional view taken along line 15—15 of FIG. 12.

FIGS. 12–14 illustrate another embodiment of a slider 126-12 including bearing pads or surfaces 230-1, 230-2 including a recessed pressure cavity 140-121, 140-122 for a slider having recessed and deep recessed surface elevations or portions. As shown, the pads or surfaces 230-1, 230-2 include stepped bearing surfaces 136-12 and raised bearing surface 134-12 above the stepped surface 136-12. The pads 230-1, 230-2 include a leading edge cavity step 144-12 from the stepped bearing surface 136-12 to a recessed cavity surface 142-12 and a trailing edge step 146-12 to the raised bearing surface 134-12 which as previously discussed reduces the raised substrate surface area to reduce stiction and shape sensitivity.

As shown the slider 126-12 include a first recessed elevation or surface and a second deep recessed elevation or surface having an elevation recessed below the first recessed surface or elevation. In the embodiment shown, the slider include a first recessed surface portion 232 proximate to the leading edge of the pads 230-1, 230-2 to provide a bearing step 156-12 from elevation 232 to the stepped bearing surface 136-12. In the embodiment shown, the recessed cavity surfaces 142-12 include a second deep recessed elevation to provide a deep leading edge cavity step 144-12 from the stepped bearing surface 136-12 to the recessed cavity surface 142-12. In the illustrated embodiment, the bearing pads or surfaces 230-1, 230-2 also include a deep cavity step 146-12 along the trailing edge from the deep recessed cavity surface 142-12 to the raised bearing surface 134-12.

The slider 146-12 includes a deep cavity region 236 having the second deep recessed elevation along a leading edge region of the slider 126-12 proximate to bearing pads 230-1, 230-1. As shown, the slider 126-12 includes a deep recessed channel 240 along a raised rail portion 242 including a trailing edge step 244 to raised bearing surface 246 proximate to the trailing edge of the slider. The slider includes stepped rail or dam 250 having a stepped surface elevated above a first recessed portion or region 252 having a first recessed elevation and a leading edge cross rail or dam 254 having a raised surface elevation (0.0 milled depth). The deep recessed surfaces are milled or etched to a depth recessed below stepped surfaces and recessed surfaces as shown. For example, in one embodiment, the first recessed surface or surfaces are milled or etched to a depth of approximately 0.7–1.0 $\mu$m and the second deep recessed surface or surfaces are milled or etched to a depth of approximately 3.5 $\mu$m. In the illustrated embodiment, the slider 126-12 includes stepped dams 256 proximate to an outer edge of recessed surface portion 232 to contain air for pressurization.

FIGS. 16–23 illustrate embodiments of sliders including a leading edge pad having an extended cross width dimension including a plurality of recessed pressure cavities, although application is not to a leading edge bearing pad or the particular leading edge bearing pad shown. The recessed pressure cavities as shown reduce the raised surface area of the bearing pad to reduce stiction for the bearing pad while providing a large effective pressurization area and lift. The recessed cavities also reduce shape sensitivity, and in particular along a cross dimension (or roll axis) of the bearing pad.

Figure 16:
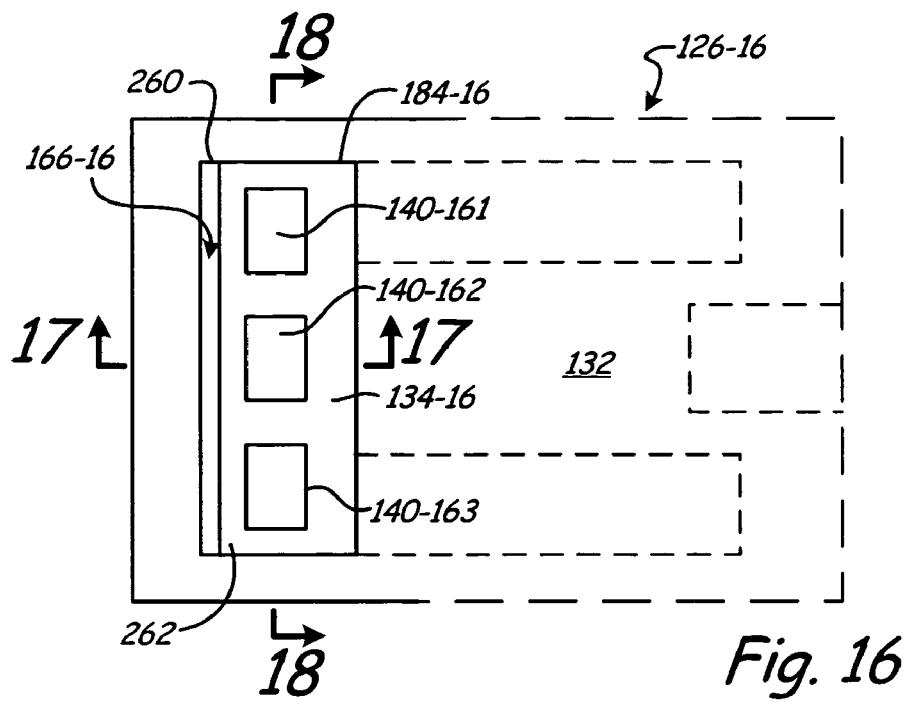
FIG. 16 is an illustrative embodiment of a slider including a leading edge bearing pad having a plurality of recessed pressure cavities.
Figure 17:
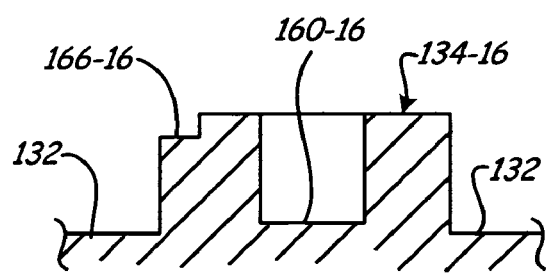
FIG. 17 is a cross sectional view taken along line 17—17 of FIG. 16.
Figure 18:
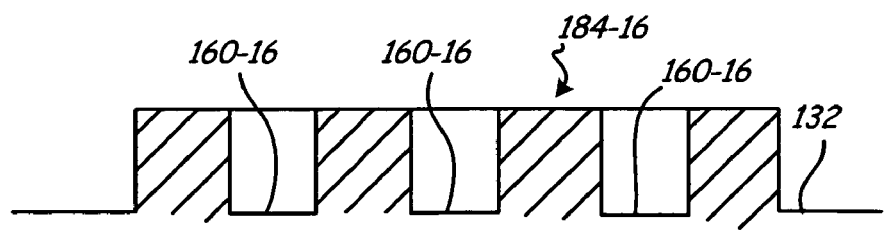
FIG. 18 is a cross sectional view taken along line 18—18 of FIG. 16.

In particular, in the slider embodiment 126-16 illustrated in FIGS. 16–18, leading edge pad 184-16 includes a stepped surface 166-16 elevated above a recessed bearing surface 132 to pressurize or provide a pressure ramp for the raised bearing surface 134-16. As shown, the raised bearing 134-16 includes a plurality of recessed pressure cavities 140-161, 140-162, 140-163 along a cross dimension of the leading edge pad 184-16 between opposed sides 260, 262. As shown, the recessed pressure cavities 140-161, 140-162, 140-163 form a cavity step about the perimeter thereof from the recessed cavity surface 160-16 to the raised bearing surface 134-16 as shown.

Figure 19:
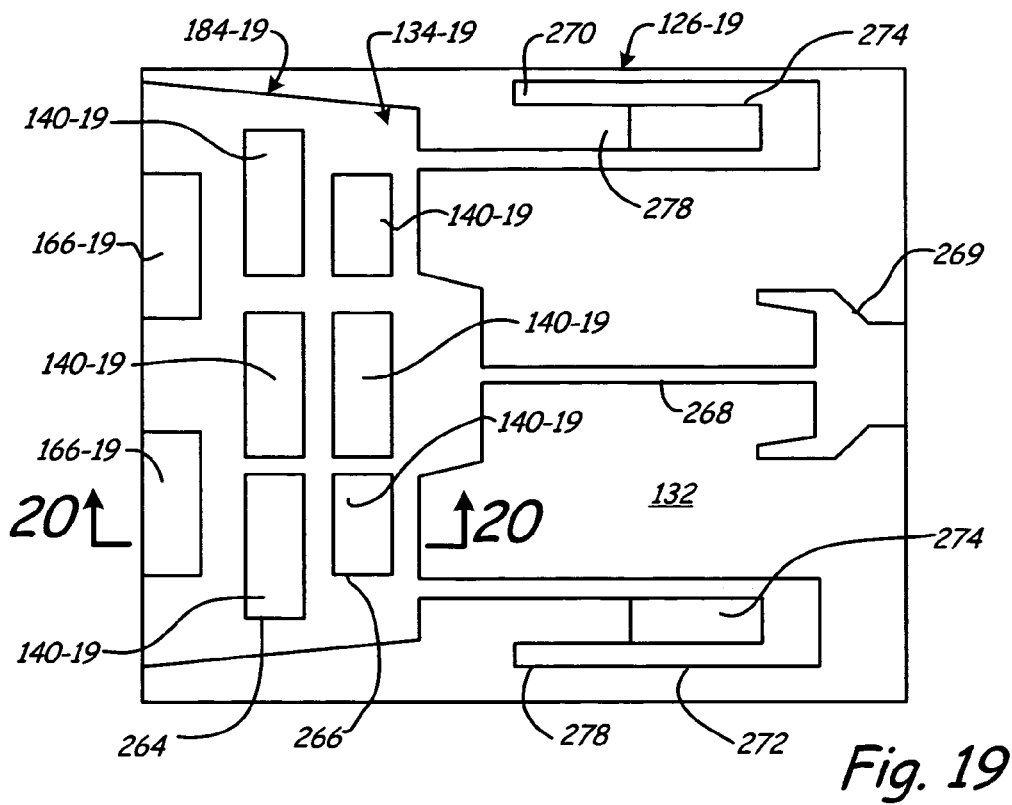
FIG. 19 is an alternate embodiment of a slider including a leading edge bearing pad having a plurality of recessed pressure cavities.
Figure 20:
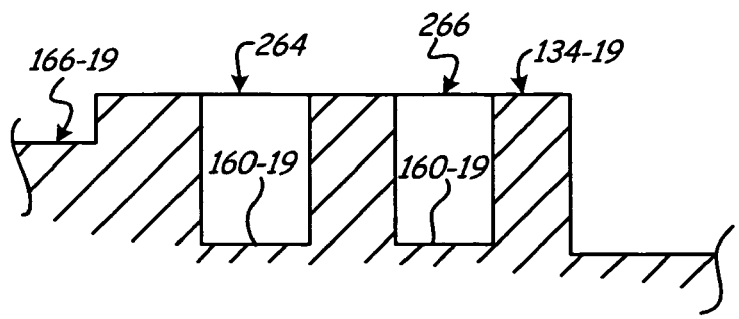
FIG. 20 is a cross sectional view taken along line 20—20 of FIG. 19.

FIGS. 19–20 illustrate an embodiment of a slider 126-19 including a leading edge pad 184-19 having rows 264, 266 of recessed pressure cavities 140-19 spaced along the cross dimension of the slider having recessed cavity surfaces 160-19 and a cavity step to the raised bearing surface 134-19 about a perimeter thereof. In the illustrated embodiment of FIGS. 19–20, the air bearing slider includes a stepped center rail 268 and opposed side rails 270, 272 (including stepped surface 274 and opened channel 278) as shown although application is not limited to the particular air bearing slider shown.

Figure 21:
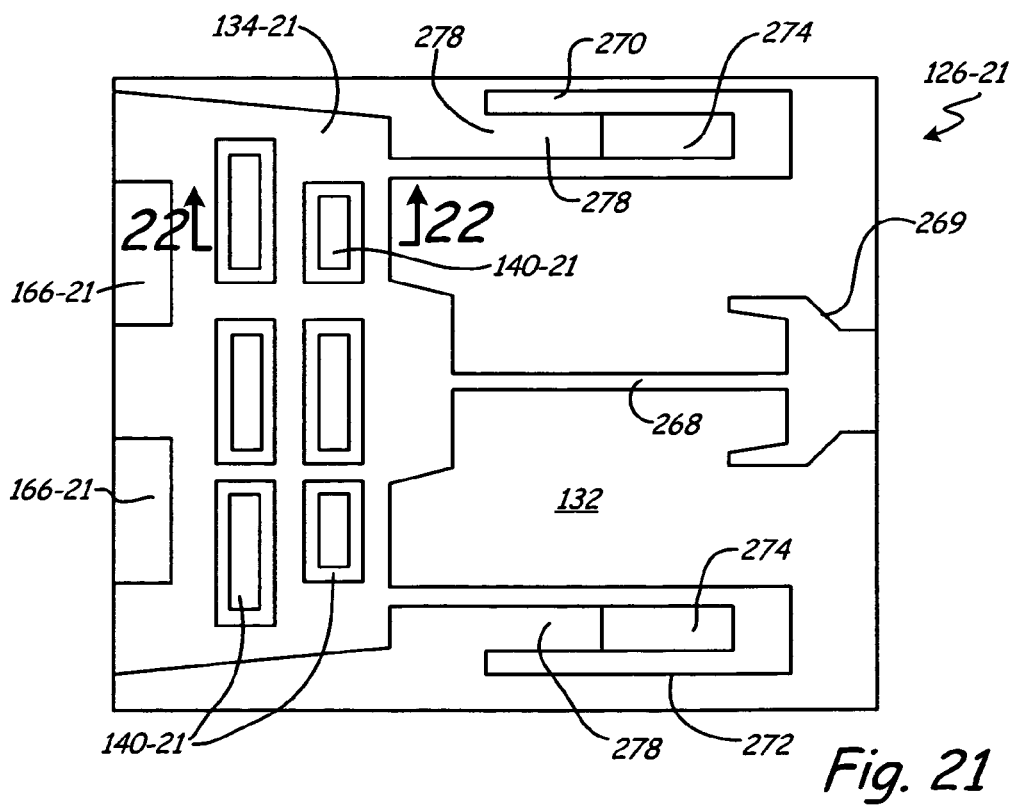
FIG. 21 is an alternate embodiment of a slider including a leading edge bearing pad having a plurality of recessed pressure cavities including multiple steps between a recessed cavity surface and a raised bearing surface.
Figure 22:
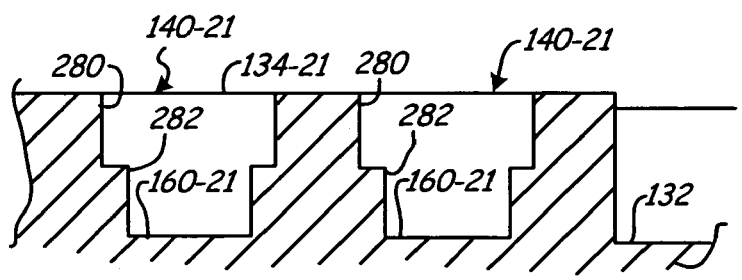
FIG. 22 is a cross sectional view taken along line 22—22 of FIG. 21.
Figure 23:
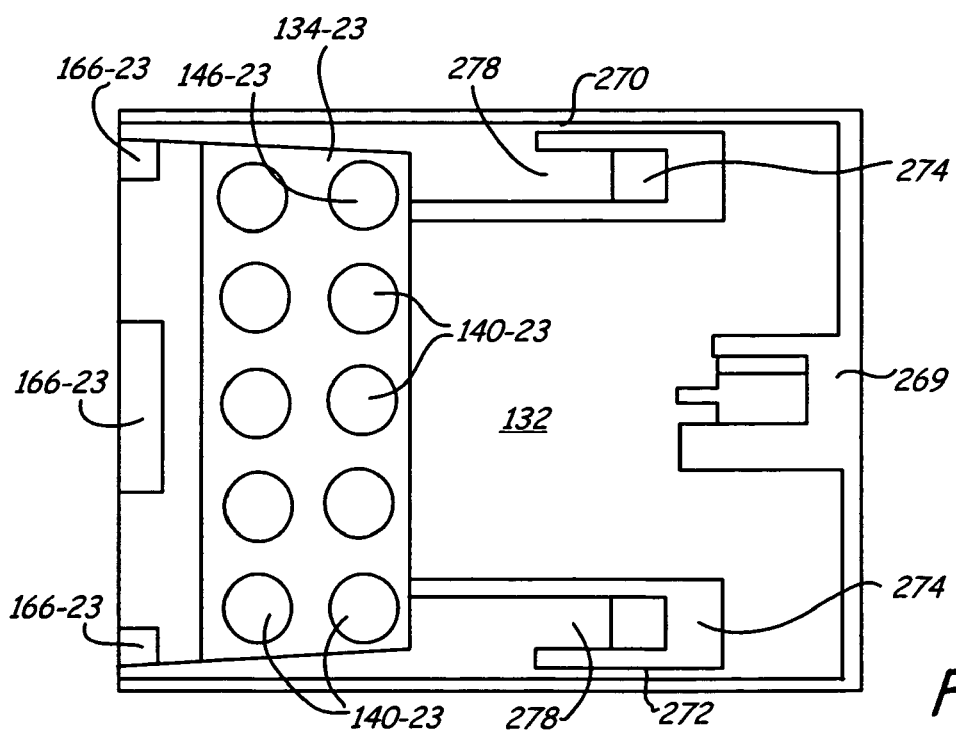
FIG. 23 is an alternate embodiment of a slider including a leading edge bearing pad having a plurality of round recessed pressure cavities.

FIGS. 21–22 illustrate an alternate embodiment of an air bearing slider 126-21 including a plurality of recessed pressure cavities 140-21 on a leading edge pad 134-21 where like numbers are used to refer to like parts in the previous figures. As shown, the recessed pressure cavities 140-21 include a plurality of steps or surface elevations 280, 282 from the recessed cavity surface 160-21 to the raised bearing surface 134-21 as shown. In an alternate embodiment where like numbers are used to refer to like parts, air bearing slider 126-23 includes a plurality of recessed pressure cavities 140-23 formed of a circular shape to provide a recessed surface area to reduce shape or cross sensitivity as previously described.

It is to be understood that even though numerous characteristics and advantages of various embodiments of the invention have been set forth in the foregoing description, together with details of the structure and function of various embodiments of the invention, this disclosure is illustrative only, and changes may be made in detail, especially in matters of structure and arrangement of parts within the principles of the present invention to the full extent indicated by the broad general meaning of the terms in which the appended claims are expressed. For example, the particular elements may vary depending on the particular application while maintaining substantially the same functionality without departing from the scope and spirit of the present invention. In addition, although the preferred embodiment described herein is directed to a magnetic data storage device, it will be appreciated by those skilled in the art that the teachings of the present invention can be applied to other data storage devices without department from the scope and spirit of the present invention.

What is claimed is:

1. A slider comprising:
    a slider body including a leading edge and a trailing edge and opposed sides;
    at least one bearing pad including a raised bearing surface elevated above a recessed surface of the slider body; and
    a stepped bearing surface recessed from the raised bearing surface and elevated above the recessed surface of the slider body proximate to the at least one bearing pad; and
    a recessed pressure cavity having a recessed cavity surface recessed from the raised bearing surface of the at least one bearing pad and the stepped bearing surface and including a leading edge cavity step from the stepped bearing surface to the recessed pressure cavity and a trailing edge cavity step to the raised bearing surface of the at least one bearing pad.

2. The slider of claim 1 wherein the at least one bearing pad and the raised bearing surface thereof formed at a substrate surface of the slider body is one of a leading edge bearing pad or a trailing edge bearing pad.

3. The slider of claim 1 wherein the at least one bearing pad includes a leading edge and a trailing edge along a leading edge portion of the slider.

4. The slider of claim 1 wherein the trailing edge cavity step includes a cavity step from the recessed cavity surface to the raised bearing surface.

5. The slider of claim 1 wherein the raised bearing surface includes a "U" shaped portion including a trailing edge portion and opposed side portions and including opposed side cavity steps to the raised bearing surface along the opposed side portions.

6. The slider of claim 1 wherein the at least one bearing pad includes a length dimension and a cross dimension wherein a length to cross dimension ratio of the at least one bearing pad is less than or equal to 2.

7. A slider comprising:
    a slider body including at least one bearing pad including a raised bearing surface elevated above a leading edge step region and a recessed surface of the slider body and a recessed pressure cavity having a recessed cavity surface enclosed by a cavity step including a leading edge cavity step from the leading edge step region to the recessed cavity surface and a trailing edge cavity step to the raised bearing surface.

8. The slider of claim 7 wherein the raised bearing surface includes a "U" shaped structure to form the trailing edge cavity step and opposed side steps to the raised bearing surface extending along opposed sides of the recessed pressure cavity.

9. The slider of claim 7 wherein the raised bearing surface is textured.

10. The slider of claim 7 wherein the at least one bearing pad includes a leading edge bearing pad.

11. The slider of claim 7 and further comprising a center rail or side rails having a raised bearing surface formed therealong.

12. The slider of claim 7 wherein a length to cross dimension ratio of the at least one bearing pad is less than or equal to 2.

13. The slider of claim 7 and include a multiple recessed surfaces or elevations including a first recessed surface recessed below the leading edge step region and the raised bearing surface and a second deep recessed surface recessed below the first recessed surface and the recessed pressure cavity surface is formed at a recessed depth of the second deep recessed surface.

14. The slider of claim 13 and further comprising a leading edge bearing step from the first recessed surface to a stepped bearing surface of the leading edge step region.

15. The slider of claim 13 and further comprising a trailing edge bearing step from the raised bearing surface to the second deep recessed surface.

16. The slider of claim 7 wherein the at least one bearing pad includes a leading edge bearing pad having an expanded cross width dimension having the recessed pressure cavity formed thereon or a plurality of spaced leading edge bearing pads each having a recessed pressure cavity formed thereon.

17. A slider comprising:
    a slider body including at least one leading edge bearing pad between a leading edge and a trailing edge of the slider and the at least one leading edge bearing pad having a raised bearing surface and a stepped bearing surface elevated above a recessed surface of the slider and a recessed pressure cavity having a recessed cavity surface recessed from the raised bearing surface and the stepped bearing surface and the leading edge bearing pad including a cavity step from the stepped bearing surface to the recessed cavity surface and the recessed cavity surface to the raised bearing surface or a plurality of recessed cavities having a cavity step to the raised bearing surface about a perimeter thereof.

18. The slider of claim 17 wherein the plurality of recessed cavities are one of rectangular, square or round shape.

19. The slider of claim 17 wherein the plurality of recessed cavities include a plurality of rows of spaced recessed cavities between the leading and trailing edges of the at least one bearing pad or a plurality of recessed pressure cavities spaced between opposed sides of the at least one bearing pad.

20. The slider of claim 17 including a plurality of cavity steps from the recessed cavity surface to the raised bearing surface.

* * * * *